Nov. 25, 1969  R. W. SHELDON  3,480,060
SPACER CONSTRUCTION AND METHOD OF MANUFACTURING SAME
Filed March 28, 1968  2 Sheets-Sheet 1
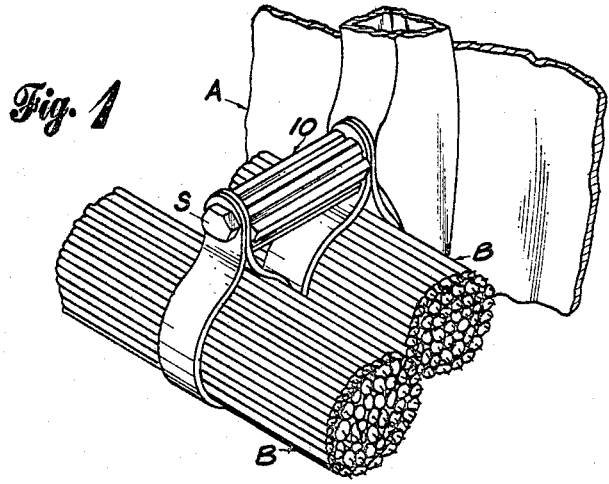
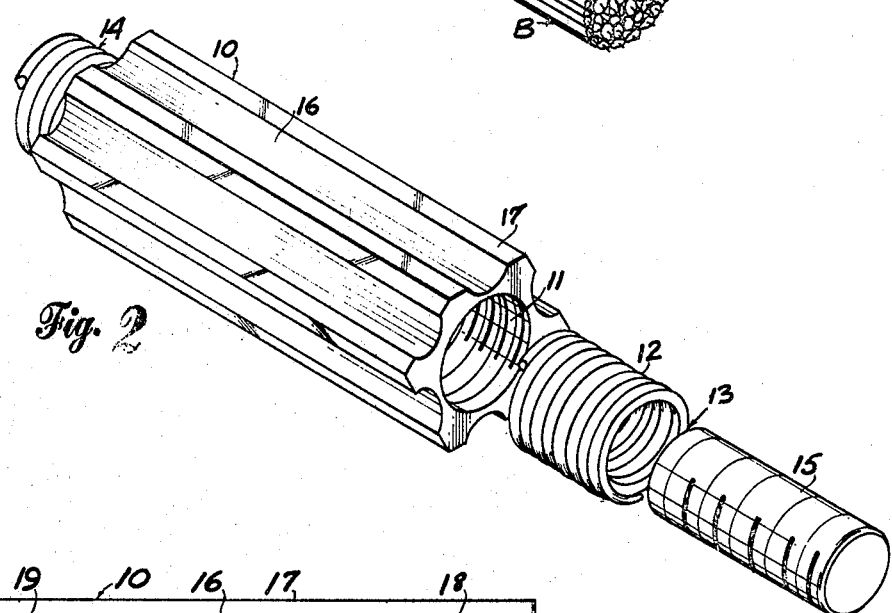
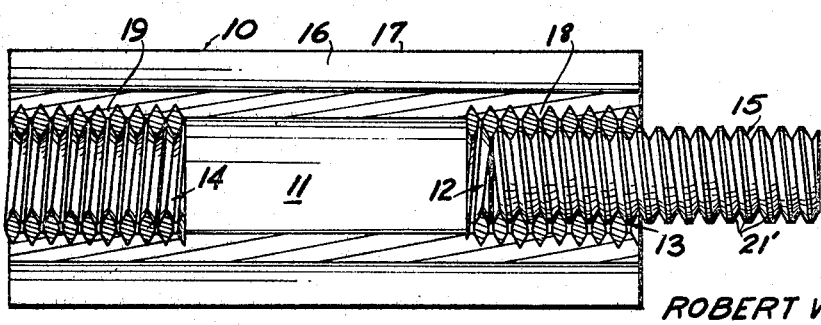
INVENTOR.
ROBERT W. SHELDON
BY Newton, Hopkins,
& Ormsby
Attorneys Nov. 25, 1969     R. W. SHELDON     3,480,060
SPACER CONSTRUCTION AND METHOD OF MANUFACTURING SAME
Filed March 28, 1968     2 Sheets-Sheet 2

INVENTOR.
ROBERT W. SHELDON
BY Newton, Hopkins,
& Ormsby
Attorneys

United States Patent Office 3,480,060
Patented Nov. 25, 1969

3,480,060
SPACER CONSTRUCTION AND METHOD OF MANUFACTURING SAME
Robert W. Sheldon, 560 Carriage Drive NE., Atlanta, Ga. 30328
Filed Mar. 28, 1968, Ser. No. 716,916
Int. Cl. F16b 39/30, 3/22, 23/00
U.S. Cl. 151—14                                10 Claims

ABSTRACT OF THE DISCLOSURE

A lightweight spacer construction including a sleeve adapted to be engaged by conventional tool for rotating the same, a helically coiled thread insert screwed in one end of the sleeve and a threaded stud assembly screwed into the opposite end of the sleeve. The method of manufacturing the spacer construction comprising the steps of forming a hollow member having an outside configuration to be engaged and rotated by a conventional tool, internally threading each end of said member, screwing a helically coiled thread insert in one end of the sleeve and subsequently screwing a threaded stud assembly into the other end of the sleeve.

BACKGROUND OF THE INVENTION

Field of invention

This invention relates generally to a spacer construction and a method of manufacturing the same, and, more particularly, to a spacer construction including a sleeve having a helically coiled thread insert in opposite ends thereof and a threaded stud screwed into one of the thread inserts; and a method of making a spacer construction comprising the steps of extruding a hollow member, severing the hollow member into selected lengths, internally threading each end of the severed member, screwing a helically coiled insert in each end of the severed member, and subsequently screwing a threaded stud into one of the thread inserts.

Discussion of the prior art

Spacers having a threaded stud extending from one end and female threads in the opposite end thereof are well known in the prior art. Most of these spacers are, however, manufactured out of a relatively heavy material and have a unitary construction, especially where the strength of the spacer is critical. In applications where the weight of the spacer becomes critical, such as the aircraft industry, attempts have been made to lighten the spacer without reducing its strength characteristics by the use of titanium which is machined to provide a relatively lightweight structure. The basic problem with using titanium for these spacers has been that the cost of material therefor and manufacture thereof is prohibitive.

SUMMARY OF THE INVENTION

These and other problems and disadvantages associated with the prior art spacers are overcome by the invention described herein in that the spacer construction and method provides a spacer which is light in weight, high in strength, and economical to produce. The spacer construction comprises a sleeve having a central passage therethrough and which is internally threaded at each end thereof, a helical coil thread insert is screwed into each end thereof, and a threaded stud is screwed in one of the helically coiled thread inserts.

The method of the invention comprises generally the steps of forming a sleeve having a central passage therethrough of a predetermined length, internally threading a portion of the sleeve adjacent each end, screwing a helically coiled thread insert into each end of the sleeve, and subsequently screwing a stud into one of a helically coiled thread inserts.

These and other features and advantages of the invention will be more fully understood upon consideration of the following specification and accompanying drawings wherein like characters of reference designate corresponding parts throughout and in which:

BRIEF DESCRIPTION OF THE DRAWINGS

FIG. 1 is a perspective view showing the invention and use;

FIG. 2 is an exploded perspective view of one embodiment of the invention;

FIG. 3 is a cross sectional view of that embodiment of the invention shown in FIG. 2 taken along the central axis thereof and showing the embodiment assembled;

Figure 4:
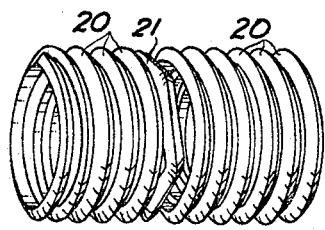
FIG. 4 is a perspective view of a helically coiled thread insert utilized in the invention.

These figures and the following detailed description disclose specific embodiments of the invention, however, the inventive concept is not limited thereto, since the invention may be embodied in other forms.

DESCRIPTION OF ILLUSTRATIVE EMBODIMENTS

Referring particularly to FIGS. 1–4, it will be seen that the first embodiment of the spacer construction comprises generally a sleeve 10 having a central passage 11 therethrough, a stud assembly 13 positioned in one end thereof and a helically coiled thread insert 14 positioned in the opposite end thereof. The stud assembly 13 includes a helically coiled thread insert 12 screwed into the sleeve 10 and a threaded stud 15 screwed into the insert 12.

The sleeve 10 is preferably manufactured of lightweight material, such as aluminum, and has a hexagonal cross-sectional configuration to provide wrenching surfaces 17 to be engaged by a conventional tool (not shown) when installing the spacer. Longitudinally extending flutes 16 may be provided along the periphery of the sleeve 10 to further reduce the weight thereof without materially reducing the strength of the spacer or the installation characteristics thereof since enough material will be left along the periphery of the sleeve 10 to be engaged by the tool (not shown) to install the spacer in conventional manner. The sleeve 10 is internally threaded as at 18 to engage the thread insert 12 and is internally threaded as at 19 to engage the thread insert 14.

The helically coiled thread inserts 12 and 14 are commercially available on the market under the trade name "Heli-Coil" and are manufactured by the Heli-Coil Corporation of Danbury, Connecticut. The insert 14 is illustrated in FIG. 4 and is provided with free running threads 20 and a distorted locking thread 21. The particular thread inserts 12 and 14 may be of the standard type which is provided with only free-running threads 20 or may be the screw-lock type as shown in FIG. 4, or may be the high-torque type which is provided with a plurality of distorted locking threads such as the thread 20 shown in FIG. 4. Preferably, the thread insert 12 should be a high-torque type insert so that the spacer will remain in place as will be explained hereinafter when a conventional screw or bolt S screwed into the thread insert 14 is removed. The thread insert 14 will preferably be of the screw-lock type as shown in FIG. 4 to prevent loosening of a conventional bolt or screw S when screwed into the insert 14. The inserts 12 and 14 are screwed into the threads 18 and 19, respectively, in conventional manner as provided by the manufacturer, Heli-Coil Corporation.

The threaded stud 15 is provided with threads 21' which can be screwed into the thread insert 12 and will be held therein. The stud 15 may be manufactured of any convenient material, however, it is preferred that the stud 15 be of steel or titanium to preserve the desired strength characteristics of the spacer. The stud 15 is driven into place in the thread insert 12 in conventional manner.

Figure 5:
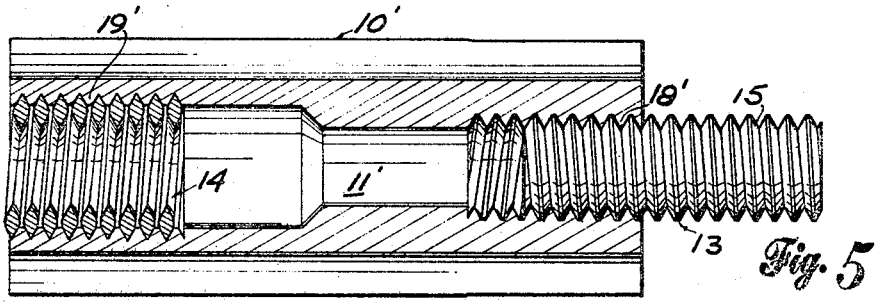
FIG. 5 is a cross-sectional view taken along the central axis of a second embodiment of the invention.

The second embodiment of the spacer construction shown in FIG. 5 utilizes a sleeve 10' similar in construction to the sleeve 10 with a stepped central passage 11' therethrough and internal threads 18' and 19' in each end thereof. The threads 18' are of such size and configuration to threadedly receive the threaded stud 15 of the stud assembly 13' therein and the threads 19 are so constructed and arranged to receive the helically coiled thread insert 14 therein just as in the first embodiment thereof. In order to lock the stud 15 in the sleeve 10', the stud 15 is first screwed into the threads 18' and then the sleeve 10 is swaged therearound to prevent removal of the stud 15. In application, the second embodiment of the invention functions just as the first embodiment thereof.

The spacer construction is utilized principally in aircraft applications wherein it is necessary to space wire bundles B with respect to each other in an aircraft structure A, as shown in FIG. 1. The stud 15 is screwed into an appropriate self-locking high-torque thread (not shown) formed in the aircraft structure A to position the first wire bundle B closely adjacent the aircraft structure A and then the second wire bundle B is attached to the opposite or female end of the spacer construction by another spacer or by a screw or bolt S as shown in FIG. 1. Since the stud 15 cannot be easily removed from the sleeve 10 or from the aircraft structure A, the screw S in the female end of the spacer construction can be easily screwed into place or removed as the need arises without removing the spacer construction from the aircraft structure A.

Figure 6:
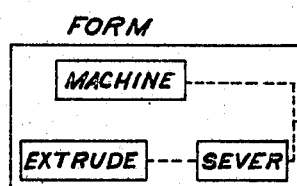
FIG. 6 is a flow diagram illustrating the steps of one embodiment of the method of the invention; and, FIG. 7 is a flow diagram illustrating an alternate embodiment of the method of the invention.

One embodiment of the method of the invention is shown schematically in FIG. 6. This embodiment of the method comprises generally the steps of forming the sleeve 10, tapping threads in each end of the sleeve 10 to form the threads 18 and 19, installing the helically coiled thread inserts 12 and 14, and finally screwing the stud 15 into thread insert 12. The sleeve 10 may be formed by extruding and severing the extruded sleeve 10 into lengths or by machining the sleeve 10. When the sleeve 10 is extruded, the central passage 11 and flutes 16 are formed thereon as an incidence to the extruding operation and then the extruded sleeve, having an indeterminate length, is cut into desired lengths to make the spacer construction. The central passage 11 is of such a diameter that all that is necessary to form the threads 18 and 19 is that the sleeve 10 be appropriately tapped in conventional manner of each end thereof.

The thread inserts 12 and 14 are installed in conventional manner using conventional tools and the stud 15 is then screwed into the insert 12 in conventional manner. It will be noted, that preferably the thread insert 12 has a plurality of locking threads 20 so that the stud 15 will be securely locked in place, and that the threaded insert 14 has a fewer number of locking threads 20 so that when another stud 15 or a screw S, as shown in FIG. 1, is screwed into the thread insert 14, less torque will be needed to drive the stud 15 or screw S into or out of the thread insert 14 and the spacer construction will remain in place when the stud 15 or screw S is removed from the thread insert 14.

When the sleeve 10 is machine formed, the hexagonal shape of the sleeve 10 is first produced and then the central passage 11 and flutes 16 machined therein to form the final construction of the sleeve 10.

Figure 7:
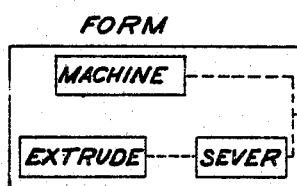

A second embodiment of the method of the invention shown in FIG. 7 which comprises generally the steps of forming the sleeve 10', threading one end of the sleeve 10 to receive the stud 15, and threading the other end of the sleeve 10' to receive the thread insert 14, installing the stud 15 in that end of the sleeve 10' threaded to receive the stud 15, swaging that end of the sleeve 10' which received the stud 15, and subsequently installing the helically coiled insert 14. The sleeve 10' is formed in this embodiment of the method of the invention just as the sleeve 10 is formed in the other embodiment of the method however, it must be noted that the passage 11 now has a smaller diameter at that end of the sleeve 10' which threadedly receives the thread insert 14 to compensate for the difference in diameters when the thread insert 12 is not utilized to position the stud 15 in the sleeve 10.

While specific embodiments of the invention have been disclosed herein, it is to be understood that numerous adaptations, modifications, and substitutions may be utilized without departing from the scope of the invention.

What is claimed as invention is:

1. A spacer construction for spacing objects from a support for use with fasteners comprising:
 a sleeve member defining a passage therethrough, said sleeve member being internally threaded along said passage adjacent opposite ends of said sleeve member;
 a first helically coiled thread insert screwed into one threaded end of said sleeve member;
 a second helically coiled thread insert screwed into the threaded end of said sleeve member opposite said first thread insert;
 an externally threaded stud screwed into said second helically coiled thread insert for a portion of its length and said second thread insert including locking means to preclude inadvertent removal of said stud from said second threaded insert and said sleeve member,
 the protruding end of said stud having threads thereon adapted to be screwed into said support member, said first helically coiled thread insert adapted to threadedly receive the fastener carrying the object to support the object in a spaced relationship to the support, and the protruding end of said threaded stud adapted to be screwed into said first helically coiled thread insert of another similar spacer to extend the length of the spacer construction.

2. The spacer construction of claim 1 wherein said first helically coiled thread insert includes one distorted locking thread and a plurality of free running threads and wherein said locking means of said second helically coiled thread insert includes at least two distorted locking threads and a plurality of free running threads.

3. The spacer construction of claim 2 wherein said sleeve member has an external hexagonal cross-section to provide wrenching surfaces, each wrenching surface being fluted along its length to reduce the overall weight of said sleeve member.

4. A spacer constrpction for spacing objects from a support for use with fasteners comprising:
 a sleeve member defining a stepped passage therethrough, including portions of different diameters adjacent opposite ends thereof, said sleeve member being internally threaded along each of said stepped portions of said passage adjacent opposite ends of said sleeve member;
 a helically coiled thread insert screwed into said threaded end of said sleeve member in the larger diameter stepped portion of said passage; and
 an externally threaded stud screwed into said threaded end of said sleeve member in the smaller diameter stepped portion of said passage opposite said thread insert for a portion of the length of said stud, the protruding end of said stud having threads thereon adapted to threadedly engage the support and position the spacer construction thereon, said end of said sleeve member receiving said stud being swaged around said stud to preclude inadvertent removal of said stud from said sleeve member, and said helically coiled thread insert adapted to threadedly receive the threaded fastener having the same diameter as said stud.

5. The spacer construction of claim 4 wherein said sleeve member has an external hexagonal cross-section to provide wrenching surfaces, each of said wrenching surfaces being fluted along its length to reduce the overall weight of said sleeve member and wherein said helically coiled thread insert includes one distorted locking thread and a plurality of free running threads.

6. A method of manufacturing a spacer construction comprising the steps of:
forming an elongate member having a stepped cylindrical passage therethrough including portions of different diameters adjacent the opposite ends thereof;
internally threading said portions of different diameters of said elongate member along the passage;
screwing a threaded stud into the threaded end of said elongate member in the smaller diameter stepped portion of the passage so that a threaded portion of said stud protrudes therefrom;
swaging that end of said elongate member engaging said stud to lock said stud into position; and,
screwing a helically coiled thread insert into the threaded end of said elongate member opposite said stud of a size that would receive said stud.

7. A method of manufacturing a spacer construction comprising the steps of:
forming an elongate member having a cylindrical passage therethrough;
internally threading each end of said elongate member along the passage;
screwing a first helically coiled thread insert having at least two distorted locking threads into one threaded end of said elongate member;
screwing a threaded stud into said first helically coiled thread insert so that a threaded portion thereof protrudes therefrom; and,
screwing a second helically coiled thread insert having one distorted locking thread into the threaded end of said elongate member opposite said first thread insert.

8. The method of claim 7 wherein said step of forming said elongate member is a machining step.

9. The method of claim 7 wherein said step of forming said elongate member is an extruding step.

10. The method of claim 7 wherein said step of forming said elongate member includes extruding a hollow member of indefinite length provided with driving surfaces for rotating said member and with each driving surface fluted along its length, and subsequently severing said member of indefinite length into a plurality of members of predetermined length.

References Cited

UNITED STATES PATENTS

| | | | |
|---|---|---|---|
| 548,302 | 10/1895 | Dwyer | 287—117 X |
| 1,378,015 | 5/1921 | Erickson | 287—117 X |
| 1,425,591 | 8/1922 | Jaques | 85—34 |
| 1,674,986 | 6/1928 | Norwood | 85—32 X |
| 2,616,307 | 11/1952 | Mallory. | |
| 3,003,379 | 10/1961 | Pribitzer. | |
| 3,003,759 | 10/1961 | Reilly. | |
| 3,177,782 | 4/1965 | Sampson. | |
| 3,365,997 | 1/1968 | Price | 85—32 |

RAMON S. BRITTS, Primary Examiner

U.S. Cl. X.R.

10—10; 85—9, 32; 248—68; 287—117